United States Patent [19]

Hoffman

[11] 4,092,044
[45] May 30, 1978

[54] CONVERTIBLE LIVESTOCK-GRAIN TRAILER

[76] Inventor: James W. Hoffman, Box 8, Wilmont, Minn. 56185

[21] Appl. No.: 756,851

[22] Filed: Jan. 5, 1977

Related U.S. Application Data

[63] Continuation of Ser. No. 657,311, Feb. 11, 1976, abandoned.

[51] Int. Cl.² .............................................. B60P 1/00
[52] U.S. Cl. ..................................... 298/27; 105/243; 296/24 C
[58] Field of Search ....................... 298/24, 25, 26, 27, 298/28, 29, 30, 31, 32, 33, 34, 35 R, 36, 37, 35 M; 296/10–12, 24 C; 105/243; 222/105, 183, 94

[56] References Cited

U.S. PATENT DOCUMENTS

| | | |
|---|---|---|
| 1,133,702 | 3/1915 | Bevington ............................ 105/255 |
| 2,970,861 | 2/1961 | Short .................................. 105/370 X |
| 3,674,303 | 7/1972 | Doonan et al. ..................... 296/24 C |
| 3,692,363 | 9/1972 | Tenebaum et al. .............. 105/243 X |
| 3,738,511 | 6/1973 | Lemon et al. ..................... 298/24 X |
| 3,756,469 | 9/1973 | Clark et al. ......................... 298/24 X |
| 4,018,480 | 4/1977 | Stone ................................ 105/243 X |

*Primary Examiner*—Frank E. Werner
*Attorney, Agent, or Firm*—Merchant, Gould, Smith, Edell, Welter & Schmidt

[57] ABSTRACT

A convertible livestock/grain hauling trailer has front, center and rear compartments, with a second livestock floor in the center compartment. Means are provided for pivoting the floor boards of the second floor downward towards front and rear to define a pair of grain hoppers, and adjustable grain outlet doors are provided in the floor board at the base of the hoppers. Support rail hangers are provided along the side walls of the trailer corresponding to both the horizontal and slope positions of the second story floor boards, and support rails for the edges of the floor boards are movable from either set of hangers to support the floor board in its corresponding position. Front and rear bull gates are optionally pivotable towards the front and rear respectively to further define the grain hoppers, and support rails are provided to hold them in position. Tarps are provided on rollers in the interior of the trailer to cover the livestock ventilation slots when the trailer is being used as a grain hauling trailer.

1 Claim, 10 Drawing Figures

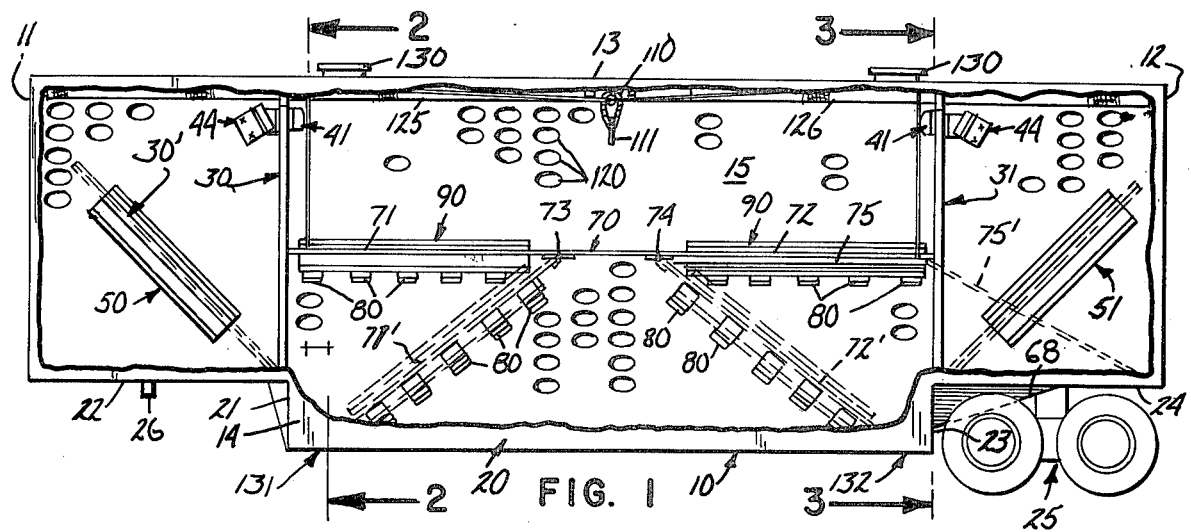
FIG. 1
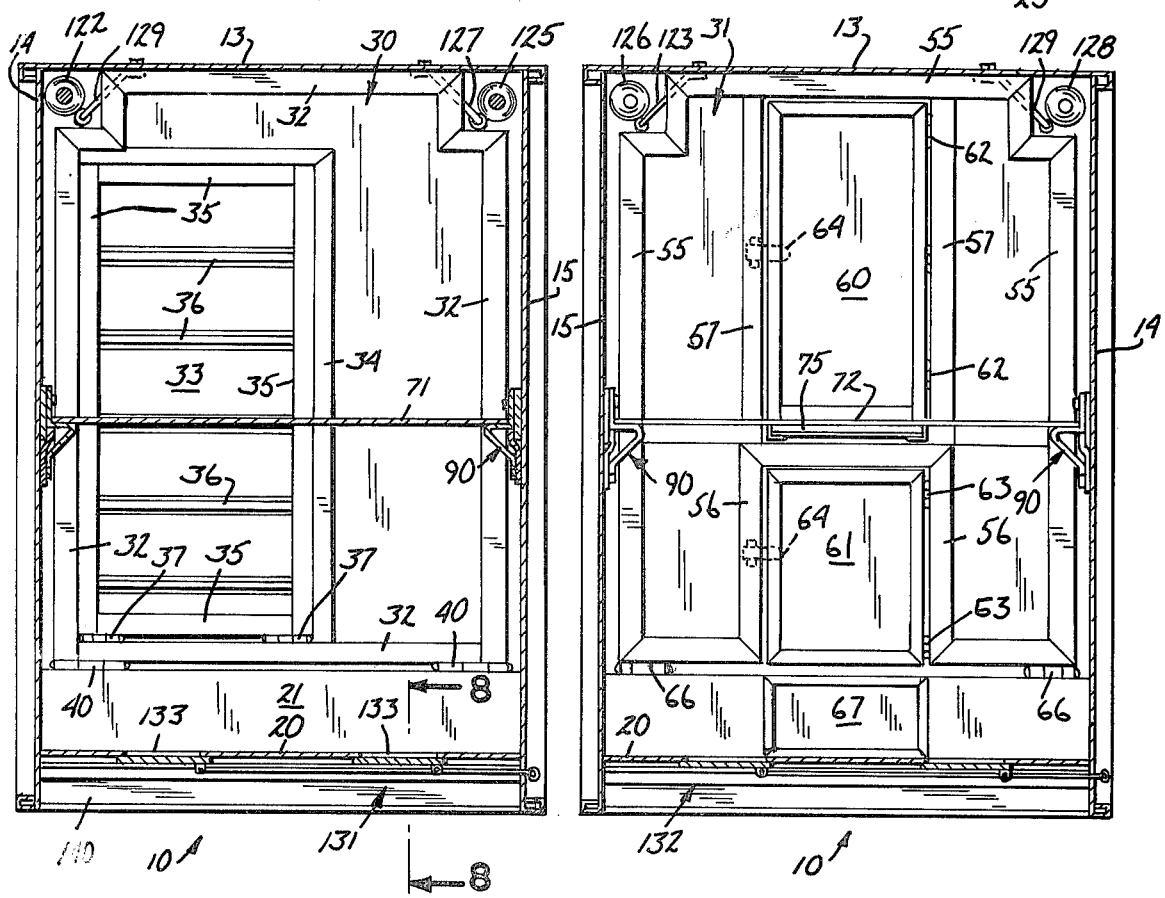
FIG. 2
FIG. 3

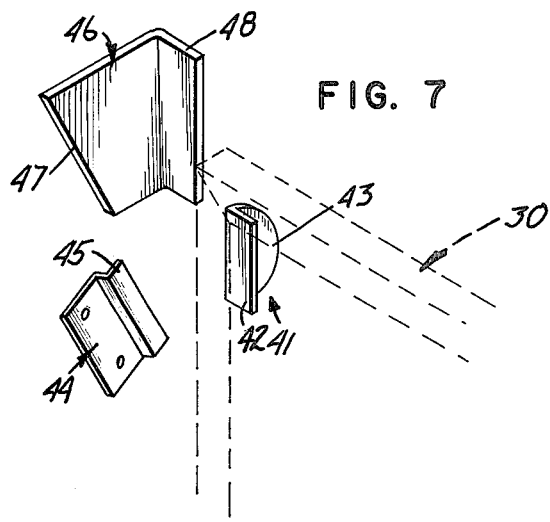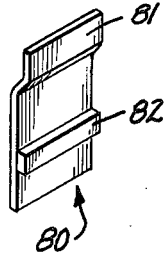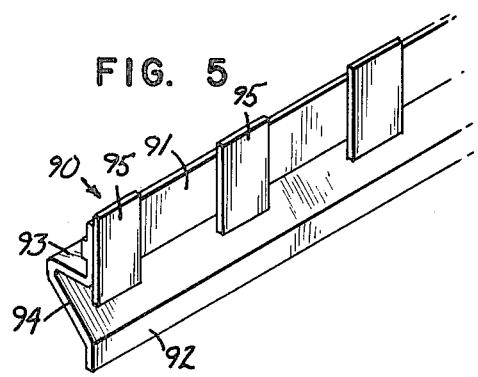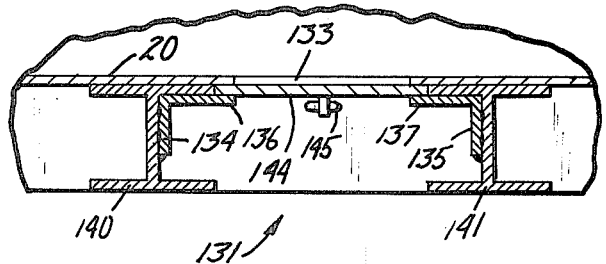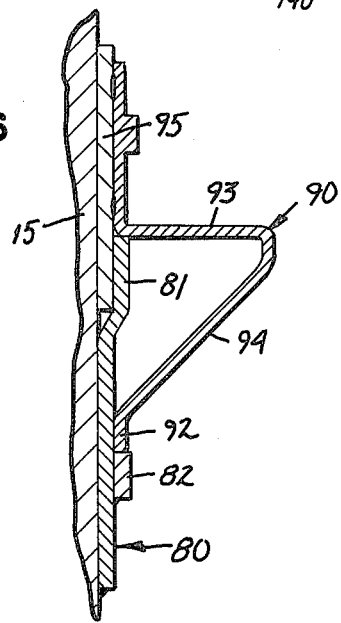

CONVERTIBLE LIVESTOCK-GRAIN TRAILER

This is a continuation of application Ser. No. 657,311, filed Feb. 11, 1976, now abandoned.

BACKGROUND OF THE INVENTION

The present invention pertains generally to livestock trailers and more particularly to a livestock trailer which is convertible to a grain hauling trailer.

Most of the livestock animals raised on farms are taken to market, or to other farms or ranches, by means of tractor-trailer truck. Unfortunately, due to the nature of the livestock business, it usually happens that the truck-trailer must return empty after having delivered a load of livestock to market. Of course, a truck traveling great distances without a load represents an inefficient use of resources. If a means could be provided whereby the load carrying capability of the truck could be at least partially used in carrying a useful load on the return trip, a savings in operating expenses and resources could be realized.

It often turns out that the same farmers and ranchers who send livestock to market often have feed grain for the animals trucked in. It would therefore be convenient if the same trailer which hauls livestock to market could be used for bringing a load of grain back to the farm.

Unfortunately, because livestock trailers have become very specialized in their construction, most of them are unsuitable for hauling grain. For one thing, they are usually constructed with slotted or gapped side walls to allow ventilation air into the animals, and of course grain would spill from these slots. For another reason, the most efficient type of livestock trailer uses a double decked arrangement or second floor in the center part of the trailer to increase the number of animals that can be carried. The multiple compartments thus created present a problem for carrying grain, because the grain would have to be somehow loaded into and out of the various compartments, and if this were to be done by manual labor, any savings in transportation costs would easily be offset by the great labor costs.

Another problem is that such trailers lack the load carrying capability to carry grain. Livestock trailers are designed to be as light as possible, while still being adequately strong to carry a load of livestock, since excess weight in the trailer represents wasted fuel consumption, for the tractor. However, the load of grain is much heavier than a load of livestock, because while a load of livestock includes a considerable amount of empty space around and between animals, a load of grain is much more compact and concentrated in terms of weight per volume. Thus, it is not possible to completely fill the trailer with grain. However, even filling the trailer only part way with grain, in order to keep the total weight down, is still generally not feasible with livestock trailers because even a partial load of grain will typically impose weight concentrations on the floors far in excess of the weight per square foot design considerations for livestock loads.

SUMMARY OF THE INVENTION

The present invention provides a livestock trailer which is easily convertible to a grain hauling trailer. A trailer comprises a box-like trailer housing with a floor, side walls, front and back walls and a roof, with a wheel assembly connected under the floor near the back end of the trailer, and hitch means connected under the floor near the front end of the trailer. Front and rear bull gates which are normally disposed in a vertical position between the sides of the trailer and the floor roof are spaced from the front and rear of the trailer, respectively to define front, center and rear compartments in the trailer. A pair of movable floor boards are provided, and means are provided for pivotally connecting one end of each of the movable floor boards between the side wall members in the center compartment for pivotal motion of the floor boards between a first substantially horizontal position in which the floor boards form a second livestock floor, and a second position in which the floor boards pivot downwardly toward the front and rear compartments respectively to define a pair of grain hoppers. Movable means are provided for attaching to the side wall members for supporting the edges of the floor boards in their downwardly sliding position and in their substantially horizontal position.

Pivotal connections may be provided for the bottoms of the front and rear bull gates, and support rails may be provided on the side wall members of the trailer in the front and rear compartments for allowing the bull gates to be pivoted to a slanting position to further define the grain hopper areas. Tarps on rollers are provided for sealing off the ventilation slots in the side wall members, when grain is being carried.

BRIEF DESCRIPTION OF THE DRAWINGS

In the drawing, FIG. 1 is a view in side elevation of a convertible trailer according to the present invention, portions thereof broken away for clarity;

FIG. 2 is a sectional view taken generally along line 2—2 of FIG. 1;

FIG. 3 is a sectional view taken generally along 3—3 of FIG. 1;

FIG. 4 is a view in perspective of a support rail hanger;

FIG. 5 is a view in perspective of a support rail;

FIG. 6 is a sectional view of a hanger, supporting rail and the side wall of the trailer of FIG. 1;

FIG. 7 is a view in perspective of the bull gate securing components of the trailer of FIG. 1;

FIG. 8 is a sectional view taken generally along the line 8—8 of FIG. 2;

DETAILED DESCRIPTION OF THE PREFERRED EMBODIMENT

Figure 9:
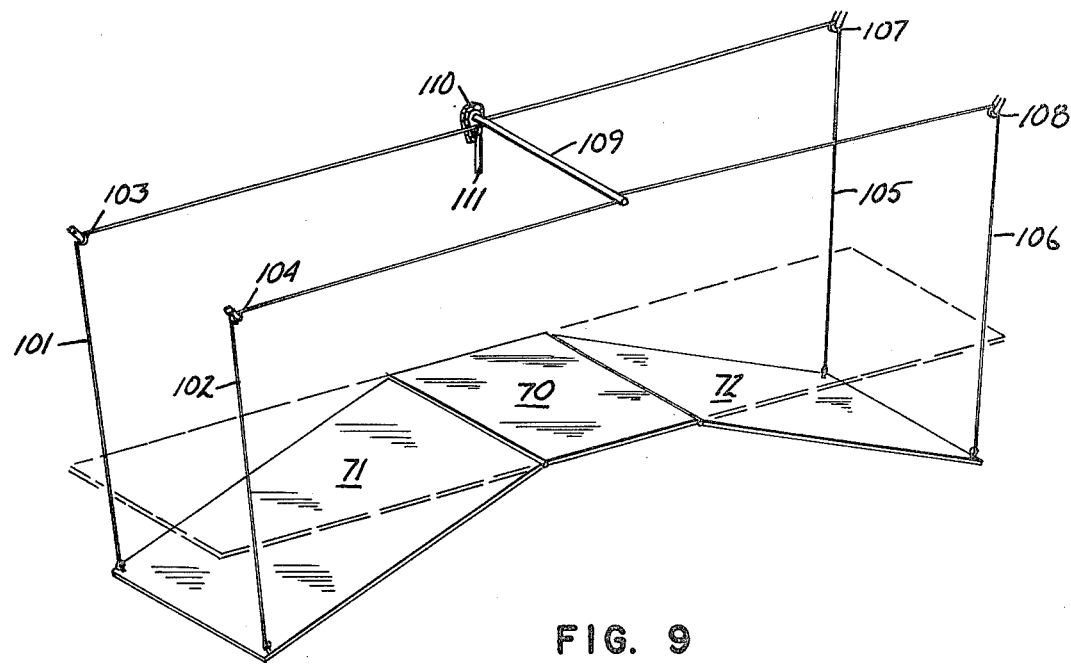
FIG. 9 is a diagrammatic view of the lifting mechanism for changing position of the movable floor boards.

In FIG. 1, the trailer includes a floor member generally designated by reference numeral 10, a front wall member 11, a rear wall member 12, a top member 13, and a pair of side wall members 14 and 15. In FIG. 1, side wall member 14 is almost entirely broken away for purposes of clarity. The floor member 10 includes a central section 20, a forward step portion 21, and a forward floor portion 22. Floor 10 also includes a rear step portion 23, and a rear floor portion 24. A wheel and axle assembly generally designated by reference numeral 25 is connected to structural members of the trailer beneath floor portion 24, as is generally known in the prior art. A suitable hitch means 26 is connected to structural members beneath floor section 22.

A pair of bull gates are provided for dividing the interior of the trailer into separate livestock carrying compartments. Forward bull gate 30 is shown in FIG. 1 positioned vertically from the floor 10 near the top of the forward step portion 21, extending vertically to roof member 13. Similarly, rear bull gate 31 connects from the floor near the top of rear step portion 23, and extends generally vertically to the roof member. The two bull gates thus serve to divide the interior into a forward compartment ahead of gate 30, a rear compartment behind gate 31, and a center compartment between the two gates. In conventional trailers, the bull gates are often merely barred barriers with doors, to keep the livestock in place enroute. In the present invention, the bull gates are solid, or covered with a solid sheet to prevent grain from passing therethrough, as hereinafter explained. Further, according to at least one embodiment of the present invention, the bull gates are pivotally mounted at their lower points, so as to be pivotable to slanted positions 30' and 31' indicated in broken lines in FIG. 1.

Referring now to FIG. 2, bull gate 30 is made in part from sheet metal, with a reinforcing frame 32 extending around the periphery thereof. A door structure 33 is provided for permitting movement of livestock to and from the front compartment. A reinforcing door frame 34 is provided in bull gate 30 to provide extra rigidity around the door opening. As shown in FIG. 2, door 33 may include a reinforcing member around its periphery, and a plurality of reinforcement members 36 in addition to the plate or sheet of metal which covers the extent of the door.

Door 33 is pivotally connected to bull gate 30 by means of a pair of door hinges 37, which connect the bottom of door 33 with the bottom of reinforcing frame member 32 of bull gate 30. These hinges, together with suitable fastening means to selectively hold the door closed (not shown) cooperate to permit the door to be opened as is generally known in the prior art for loading livestock in the front compartment.

According to the present invention, the entire bull gate 30 is pivotally connected to the forward portion of the floor member 22, near the top of forward step portion 21, by means of a pair of hinges 40. As previously mentioned, hinges 40 permit bull gate 30 to be pivoted to a slanting position as indicated in broken lines 30' in FIG. 1

The brackets which are used to lock bull gate 30 in its upright position are shown in more detail in FIG. 7. FIG. 7 shows the brackets on side 15 of the trailer only, and it will be understood that equivalent brackets are also positioned on side 14 of the trailer, but are not shown in the Figures. A stop member 41 has a flange portion 42 for abutment by the frame portion of bull gate 30, and has a flat portion 43 which is welded or otherwise secured to side wall member 15 in the appropriate position to locate bull gate 30 in a vertical position. A bracket 44 is bolted or otherwise secured to the side wall at an angularly spaced position from stop member 41, and includes a step flange 45. A wedge member 46 includes an angled edge 47 and a flange 48. Wedge 46 is manually positioned between bracket 44 and the bull gate in its upright position, with angled edge 47 mating with stepped flange 45, and flange 48 positioned snugly against the bull gate frame, so that the bull gate is held securely in place between flanges 48 and 42.

To swing the bull gate to its slanted position, wedge member 46 is manually removed, and the bull gate may be swung downwardly, sufficient clearance being provided in design of the bull gate to clear stepped portion 45 of bracket 44. To hold the bull gate in its pivoted position, a pair of angle members generally designated by reference numeral 50 are provided along either side wall member in the forward compartment. These angle members include a step or flange against which the outer frame member 32 of bull gate 30 may abut when in the pivoted position. It is generally preferable to use a somewhat elongated rail 50 for this purpose, rather than stopping the bull gate at a single point, so that loads applied to the bull gate when grain is being hauled will be distributed along the length of the rail 50, and also distributed over a considerable portion of the side wall, rather than being concentrated at one point.

As best seen in FIG. 3, rear bull gate 31 is similar in construction to the forward bull gate, previously described. Rear bull gate 31 is also made largely of a plate or sheet metal extending over a peripheral reinforcing frame 55. The rear bull gate includes an upper door 60 and a lower door 61, as is customary in order to provide a means for loading cattle to the upper or lower deck of the trailer, respectively. Reinforcing frame members 56 form a door frame around the lower door 61, while similar members 57 form a door frame for upper door 60.

Door 60 is pivoted to door frame 50 by means of hinges 62, while lower door 61 is similarly pivoted to frame members 56 by means of hinges 63. Suitable latch means 64 are provided on the outside of both doors as indicated in broken lines in FIG. 3.

Rear bull gate 31 is pivotally connected at its bottom to the rear floor member 24, by means of hinges 66. The bull gate is preferably positioned just above the rear step member 23 of the floor. Also shown in FIG. 3, is a barrier member or plate 67 which may preferably be slid into place coplanar with step portions 23, to block the opening to the ramp 68 which is customarily provided for cattle to walk down and up during loading and unloading. Barrier 67 is in place during livestock or grain carrying, and prevents grain from spilling and working its way back up the ramp area, or prevents cattle from getting their legs or heads caught.

Bull gate 31 is pivoted between vertical position 31 and slanted position 31' in the same manner as previously described with respect to forward bull gate 30. In particular, stop member 43, bracket 44 and wedge member 46 are also provided for holding bull gate 31 in a vertical position, and a rail member 51, identical to rail member 50, is provided to support the bull gate in its slanted position.

The center compartment of the trailer has a lower deck and second floor, when in the livestock carrying configuration. The second floor consists of a permanent floor section, and a pair of movable floor boards. In FIG. 1, the permanent floor section is indicated by reference numeral 70. This floor portion extends the full width of the trailer and is attached to and supported by the side wall of the trailer in the conventional manner. However, the rest of the deck of the second floor is movable, and includes a forward movable floor board 71, and a rear movable floor board 72, which are movable to positions 71' and 72' indicated in broken lines in FIG. 1. Movable floor board 71 is pivotally connected to the forward end of floor member 70 by means of a hinge assembly 73. In like manner, hinge assembly 74 connects movable floor board 72 to the other end of fixed floor board 70.

Movable floor board 72 also includes a ramp 75 which is adapted to be stowed in a slot provided beneath floor board 72, as is known in the prior art. For loading or unloading the upper deck, ramp 75 is pulled out from beneath the upper deck floor and positioned as indicated by broken lines 75' in FIG. 1.

Movable floor boards 71 and 72 are supported in either their horizontal or slanted positions, by means of support rails and hangers are shown in FIGS. 4, 5 and 6. In FIG. 4, a hanger bracket 80 is shown. Hanger bracket 80 is generally a flat metal piece, having a stepped flange portion 81 formed therein at one end. For convenience, the portion 81 may be formed by a pair of bends in bracket 80, or by any other suitable means. Bracket 80 also includes a raised support block 82, which may for convenience be formed from a separate piece of bar stock welded to the face of the bracket.

A plurality of brackets 80 are positioned at spaced intervals on both side walls of the trailer in both the horizontal plane defined by the movable floor members 71, 72 in their horizontal position, and also the sloped planes defined by the floor board members in the alternate positions 71', 72' of FIG. 1.

As seen in greater detail in FIG. 6, when bracket 80 is attached to the inside of either side wall member 14 or 15 of the trailer, a slot or gap 83 is formed between the inner surface of the side wall member and the raised stepped portion 81.

The support rail structure is shown in greater detail in FIG. 5. The supporting rail assembly 90 has an elongated extruded member, in the preferred embodiment, having generally coplanar uppermost and lowermost portions 91 and 92, and a supporting surface 93 substantially perpendicular to surfaces 91 and 92. Angled surface 94 completes the structure so as to form a rail type or channel type structure having a cross section best seen in FIG. 6. A plurality of tongue members 95 are affixed to upper planar surface 91 of the support rail at spaced intervals corresponding to the spacing of brackets 80 along the sides of the trailer. These tongued members may be rectangular metal plates which are welded or bolted to portion 91 of the support rail, and having a lower portion extending beyond the support surface 93 of the supporting rail.

The supporting rail 90 may thus be attached to the side wall member of the trailer by placing it adjacent the side wall and sliding it downward into position on the hanger brackets. In position, tongue members 95 fit into slots 93, with supporting surface 93 abutting the top of portion 81 of the hanger bracket, and with the bottom of portion 92 abutting the support block 82 of the hanger bracket. The supporting surface defined by surface 93 thus is in position to accept and support the movable floor member along its entire length. This load in turn is transferred to the side wall member of the trailer at a plurality of points where hanger brackets 80 are attached thereto, so that the load is well distributed throughout the structure.

Movement of the floor board members from one position to another may be facilitated by means of a cable and pulley system. This system is shown diagrammatically in FIG. 9 wherein a pair of cables 101 and 102 are attached to the forward end of movable floor board 71. These cables pass over a pair of pulley members 103, 104, which may be attached to the roof of the trailer. In like manner, a pair of cables 105 and 106 attach to the rear end of movable floor board 72, and pass through pulleys 107 and 108. All four cables are attached to a windup bar 109. Windup bar 109 extends across the width of the trailer near the roof thereof, and is suitably rotatably mounted to both sides thereof. It is rotated by means of a geared ratchet-type mechanism 110 having a handle or operating lever 111. Alternatively, an electric motor can be provided to rotate windup bar 109.

The cables are not used to support the floor boards, but merely are used as an aid in moving them from one position to another. To move from one position to another, the ratchet handle 111 is operated to wind the cables enough to lift the floor board off their supporting rails 90 (with the trailer in an unloaded condition). With the ends of the movable floor boards 71, 72 temporarily supported by the cables, the supporting rails 90 can be lifted off the hanger brackets 80, and repositioned for the new position of the floor board members. The cables are then unwound to lower the movable floor boards onto the supports in the new position.

Because of the plurality of ventilation holes or slots 120 provided in the side wall members of the trailer, it is necessary to provide some means for covering or obstructing these holes when carrying grain, to prevent the grain from spilling out. For this purpose tarps are provided on rollers along the top edge of the side walls. A pair of rollers can be provided on each side, so as to leave a gap therebetween for clearance around the cable windup bar 109 and supporting structures. In FIG. 1, a pair of rollers 125, 126 are shown along the top of side wall member 15. These tarp rolls also are seen in the sectional views of FIGS. 2 and 3, as are corresponding tarp rolls 127 and 128, which are found along side wall member 14, but are not seen in the partially cut away view of FIG. 1. Associated with each tarp roll is a support arm and roller assembly 129, which may be attached to the roof member 13 by means of a bolt as shown in FIG. 2, or other suitable means. The tarp rolls themselves includes windup roll assemblies and suitable means for support thereof attached either to the top of the side wall members or the edges of the roof member. The tarps themselves are made of plastic or cloth and are contoured to conform to the shape of the pair of grain hoppers defined by the bull gates and movable floor boards when in their slant positions.

A pair of hatches 130 are provided in roof member 13 for loading grain into the trailer. These hatches, which have closeable lids which may be secured by any convenient means, are positioned roughly over the vertex of the V-shaped hoppers defined by bull gate 30 and floor board 71, and bull gate 31 and floor board 72, respectively. Grain is removed from the trailers by means of doors or openings provided at the bottom of each hopper thus defined. One such grain outlet is located in a position indicated by reference numeral 131, and the other is located at position 132. Details of these outlets are also seen in the sectional views of FIGS. 2 and 3, but since they are substantially identical to each other, only the forward outlet 131 will be described in detail.

Reference is made to the lower portion of FIG. 2, wherein the center portion of the floor 20 is shown in section. A pair of rectangular openings 133 are provided in floor member 20. Also shown in FIG. 2 is a floor reinforcement I-beam 140, which is part of the original trailer structure. Floor reinforcement I-beams are spaced transverse to the longitudinal axis of the truck, at intervals along the floor. As seen in FIG. 8, the grain outlet is positioned between adjacent floor reinforcement I-beams 140, 141. A pair of angle members 134 and 135 are welded to I-beam members 140, 141, respectively. These angle members have upper flange portions 136 and 137 which extend beyond the top flange of the I-beams. A slot is thus defined between floor member 20 and the flanges 136, 137, having the thickness of the top flange of the I-beam. A pair of sliding gates 143, 144 are positioned in the slots thus formed, beneath openings 133. The two sliding gates 143 and 144 are interconnected by a connecting link 145. A gate control rod 146 then connects from gate 144 and extends to the lower outside of the trailer where it can be manually manipulated.

FIG. 2 shows control rod 146 in its normal position, in which sliding gates 143 and 144 obstruct openings 133. To unload the grain, control rod 146 is pulled to the right in FIG. 2, causing gates 143 and 144 to slide to the right and open both openings 133, allowing the grain to drain out therethrough.

Figure 10:
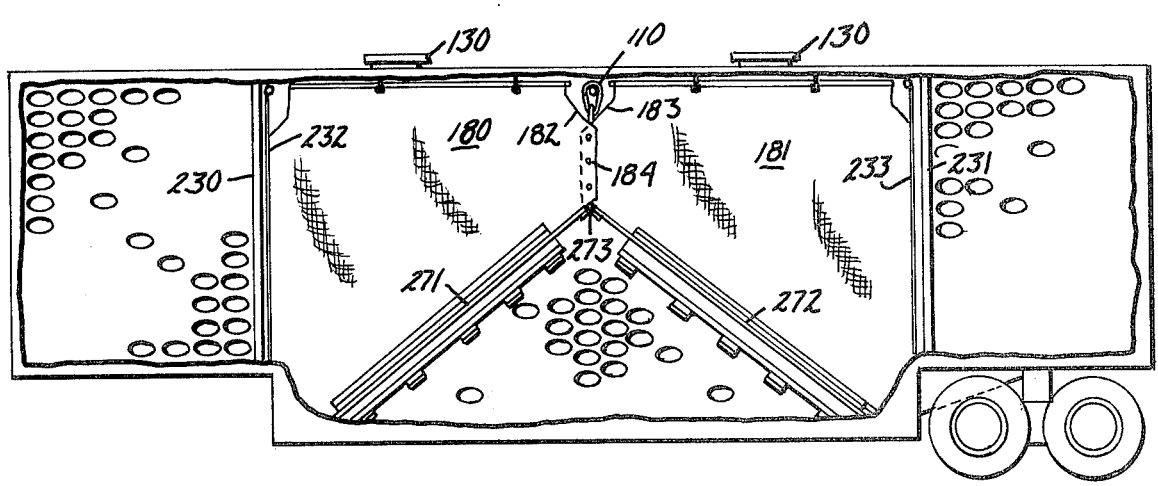
FIG. 10 is a view similar to FIG. 1 of an alternate embodiment of the present invention.

FIG. 10 shows an alternate configuration in which front bull gate 230 is not pivoted, but is fixedly secured in place as in conventional trailers. Similarly, rear bull gate 231 is fixed in place. These bull gates can be made of sheeting so as to be grain-proof. Alternatively, they can be left as parallel bars as in conventional cattle trailers, and additional tarps 232 and 233 can be strung from rollers to lie across the bull gates when grain is being hauled.

In the embodiment of FIG. 10, instead of a fixed stationary floor portion 70, the movable floor boards 271 and 272 are longer and are pivotally attached to a center bar or pivot 273 which extends the width of the trailer. The supporting rails 90 and hanger brackets 80 are repositioned accordingly.

Also shown in FIG. 10, but equally applicable to the embodiment of FIG. 1, are the tarps in their down position. Tarp 180 covers the side wall in the forward grain hopper, while tarp 181 does likewise in the rear grain hopper. Each is cut to conform to the shape of the grain hopper defined by the slope of movable floor boards 271 and 272, and by the bull gates. Of course in the embodiment of FIG. 10, the bull gates are vertical, whereas in the embodiment of FIG. 1 they are sloped, so the shape of the tarps is adjusted accordingly, but the same principles apply.

Tarps are cut out in the region 182, 183 to clear the windup mechanism, and snap or other fastening means can be provided at 184 to secure the tarps together where they overlap.

According to the present invention, there is thus provided a convertible livestock/grain trailer which may be easily converted from one mode to the other. By means of the movable support rails and pivotable floor boards and/or bull gates, a pair of grain hoppers can be formed within the trailer. After hauling grain, the trailer can be reconverted for hauling livestock, with no loss of utility for that purpose.

I claim:
1. A convertible livestock-grain trailer comprising:
    (a) a box-like trailer housing including a floor member, a pair of side wall members, a front wall member, a back wall member, and a roof member;
    (b) wheel means connected beneath said floor member near the back end of the trailer;
    (c) hitch means connected underneath said floor member near the front end of the trailer;
    (d) a front bull gate normally vertically disposed between said floor member and roof member and between said pair of side wall members and spaced from said front wall member to define a front compartment within said trailer;
    (e) a rear bull gate normally vertically disposed between said floor member and roof member and said side wall members, and spaced from said back wall member to define a rear compartment, with a center compartment between said front and rear compartments;
    (f) a fixed second livestock floorboard connected between said side wall members;
    (g) a pair of movable floor board members;
    (h) means pivotally connecting one end of each of said movable floor boards between said side wall members adjacent said fixed floorboard in said floorboard in said center compartment for pivotal motion between a first substantially horizontal position coplanar with said fixed floorboard in which said floor boards form a second livestock floor, and a second position in which said movable floor boards pivot downwardly toward said front and rear compartments respectively; and means for removably attaching to said side wall members for supporting the edges of said floor boards in their substantially horizontal position and for attachment in an alternate position on said side walls for supporting the edges of said floor boards when in their downward position so as to define a pair of grain hoppers within said center compartment; and
    (i) a pair of grain outlet means in said floor members at the base of each of said grain hoppers for unloading grain therethrough.

* * * * *